Dec. 18, 1923.  W. G. PERKINS  1,478,295
TREATMENT OF COMPLEX SULPHIDE ORES
Filed Oct. 6, 1920
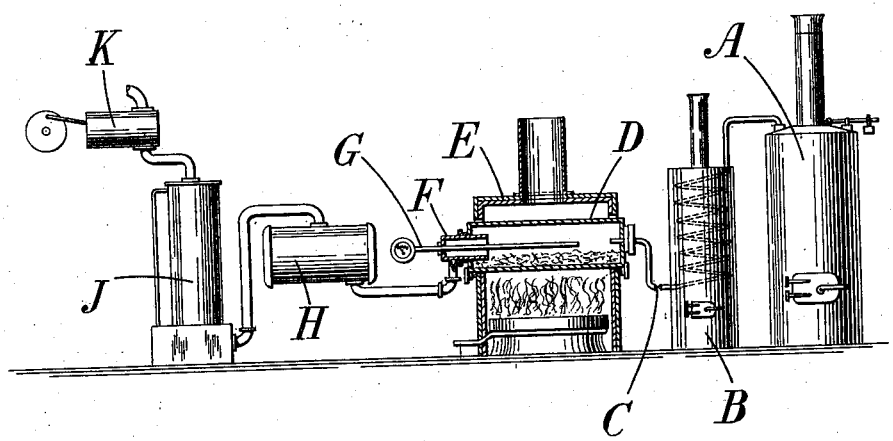
INVENTOR
WALTER GEORGE PERKINS,
BY
 ATTY.

Patented Dec. 18, 1923.

1,478,295

UNITED STATES PATENT OFFICE.

WALTER GEORGE PERKINS, OF LONDON, ENGLAND, ASSIGNOR, BY MESNE ASSIGNMENTS, TO METALS PRODUCTION COMPANY OF NORTH AMERICA INCORPORATED, OF NEW YORK, N. Y.

TREATMENT OF COMPLEX SULPHIDE ORES.

Application filed October 6, 1920. Serial No. 415,120.

*To all whom it may concern:*

Be it known that I, WALTER GEORGE PERKINS, subject of the King of England, residing at London, England, have invented certain new and useful Improvements in the Treatment of Complex Sulphide Ores, of which the following is a specification.

This invention consists in improvements in or relating to the treatment of complex sulphide ores, the object being to eliminate iron therefrom and raise the percentage of other minerals. In this specification the expression "ores" is employed to include concentrates and other mineral products.

In the treatment of complex sulphide ores the elimination of iron compounds such as iron sulphides is often very desirable but presents a difficult problem. For example with ores containing zinc and iron sulphides in addition to other metallic sulphides such as galena, chalcopyrite, stibnite or the like the separation of the galena, copper sulphides, etc., from the zinc and iron sulphides can be accomplished with commercial efficiency by several methods of mechanical concentration, or by other means, and especially by flotation, but the separation of iron sulphides particularly di-sulphides (such as marcasite and pyrites) from zinc sulphide by present methods is a difficult operation.

On the other hand the disadvantages of the presence of iron sulphides in a zinc concentrate are very marked. Firstly, it diminishes the proportion of zinc i. e. the grade of the product to be treated; indeed the presence of a percentage of iron sulphide which makes the zinc content of the concentrate less than 50% may render it unmarketable. Secondly, in distillation the iron injuriously affects the retorts. Thirdly, during air roasting, ferrites are formed which are insoluble in sulphuric acid and therefore would interfere with the efficiency of electrolytic treatment.

Again, considering the case of an ore containing pyrrhotite or pyrites etc. and chalcopyrite, the proportion of copper in the ore may be about 1.5% and in smelting such an ore it is necessary to flux the iron, an expensive process yielding very bulky slags with correspondingly large losses of copper. It would be a great advantage if the iron compounds or a substantial proportion thereof could be eliminated.

According to this invention a process for the treatment of metallic sulphide ores containing iron compounds such as iron sulphides consists in heating the ore ground to suitable size in an atmosphere of superheated steam at a controlled temperature to convert the iron compounds into magnetic compounds which are removed from the other minerals by a magnetic separator.

Preferably air is completely or substantially excluded during the steam treatment.

A feature of this invention lies in the fact that the quantity of steam used and the temperature of the ore and/or the temperature of the steam are so regulated as to ensure the required conversion of the iron compounds into magnetic compounds.

Where the ore contains iron sulphides, by the action of the superheated steam sulphuretted hydrogen and sulphur dioxide are driven off and by their interaction yield elemental sulphur which is collected.

If the quantity of sulphuretted hydrogen is larger in relation to the quantity of sulphur dioxide than that required to produce elemental sulphur, a proportion of air is introduced into the hot gases in order to oxidize the required amount of the sulphuretted hydrogen.

A specific form of this invention lies in a process for the treatment of complex ores containing zinc sulphide and also iron sulphide such as marcasite or pyrites, in which the powdered ore is introduced into a heated roasting chamber into which is passed superheated steam at such temperature that the iron sulphide is converted into a magnetic compound which is removable from the zinc and/or other non-magnetic compounds by a magnetic separator.

In the heat treatment of complex sulphide ores containing pyrites to render the latter paramagnetic, my investigations have disclosed the importance of certain factors. Economy demands that the application of heat be reduced to a minimum and that the heat used be applied in such manner as merely to ensure the required magnetization. Close regulation of the atmosphere to which the powdered ore is exposed is essential as also is the regulation of the temperature and time of reaction, and it has been pointed out that the atmosphere employed is steam. The chemical reaction involved in the magnetizing action described, being endothermic, necessitates the supply of a considerable number of heat units per unit of pyrites decomposed, and as it is impracticable to rely for this supply solely on the superheat of the steam, an external source of heat is required. The escape of sulphur gases into the atmosphere and also dust losses should be prevented. Continuity of working is desirable.

When acting upon powdered complex sulphide ore containing pyrites with superheated steam under regulated conditions, the process of rendering the pyrites paramagnetic may be very efficient and I have found that if the reaction due to the steam under suitable thermal conditions is caused to affect only the surfaces of the pyrites particles, these particles can be rendered sufficiently susceptible to magnetic attraction to allow of their effective removal by a magnetic separator.

According to this invention, a process for the treatment of metallic sulphide ores containing pyrites consists in heating the ore ground to suitable size in an atmosphere of steam at such a controlled temperature and for such a time that the surfaces only of the pyrites particles are affected so that these particles are rendered paramagnetic and can be removed from the other minerals by a magnetic separator.

To ensure this surface action on the pyrites particles by the atmosphere of steam at suitable temperature, it is essential that each particle may have its surface exposed to the action of the steam at the necessary temperature. It is therefore a feature of this invention that the powdered ore during the action of the steam thereon is subjected to agitation or movement to expose all the particles to the steam. This may conveniently be done by the employment of a rotary cylindrical furnace chamber, say of steel, externally heated and supplied with a current of superheated steam. The external heating of the rotary cylinder is so regulated as to ensure the supply of the heat necessary for the endothermic reaction.

To secure continuity of operation the supply of powdered ore to the rotary cylinder may be through an inlet conduit entering the cylinder axially at one end and the ore may be fed through a gas-sealed supply device, such as a feed hopper with two gas-tight valves or partitions intermittently and alternately operated, or through a rotary valve with a succession of vanes forming gas-locked supply pockets. So also the discharge of the treated ore may be through a fixed chamber connected to the discharge end of the rotary cylinder by a gland or sealed joint, and the treated ore may leave the fixed chamber through a gas sealed outlet device similar to that at the inlet.

The prevention of the escape of sulphur gases and also the prevention of dust losses are ensured by passing the gaseous furnace products through an axial outlet to a condenser in which the excess of steam is condensed and elemental sulphur and any ore dust particles are collected. The sulphur may be removed from the ore thus deposited by any convenient means such as melting under steam pressure.

The accompanying drawing is a diagrammatic view of one form of apparatus suitable for carrying this invention into effect.

A steam generator A (which may utilize waste heat from the furnace) is connected to supply steam to a superheater B in which the steam may preferably be heated to a temperature substantially equal to that of the reaction cylinder, and then fed through a regulating valve C to the furnace.

The furnace chamber D is a rotary steel cylinder closed against access of air or furnace gases, and mounted in a heating chamber E. The cylinder may be slightly inclined downwards towards the outlet end and may have internal means for ensuring that the whole of the ore passing through the cylinder is effectively exposed for the required time and at the required temperature to the action of the superheated steam. The inlet and outlet for ore to and from the cylinder may be arranged for continuous working, as above described. The steam, preferably previously superheated to the average reacting temperature, enters the cylinder axially at one end. The outlet for gaseous products is an axial conduit F at the opposite end, and a pyrometer G projects through this outlet into the cylinder. According to this invention, for efficient utilization of the steam, the current of steam may be passed in a direction opposite to the travel of the ore. The gaseous products are led to a simple form of condenser H where any remaining steam is condensed to water, sulphuretted hydrogen and sulphur dioxide react to form elemental sulphur which is collected, any excess of sulphur gases are absorbed and particles of ore carried over by the gases in the form of dust are deposited.

From the condenser H the gases pass to a scrubber J connected to a vacuum pump K.

The permanent gases resulting from the reaction are so small in volume as not to inhibit the effective removal of all sulphur gases by scrubbing, which would be the case if air roasting were employed or large volumes of permanent gas were otherwise present.

By the rotation of the cylinder and consequent agitation of the powdered ore, the various ore particles and their different surfaces are exposed to the action of the steam, and the surfaces of the particles of pyrites acquire films of paramagnetic iron compounds which, it appears, consist mainly or entirely of iron sulphides having a less sulphur content than $FeS_2$, a comparatively small proportion of the total sulphur of the pyrites being hydrolyzed by the steam with the formation of $H_2S$ and $SO_2$.

The heat necessary for bringing the ore to the required temperature and for effecting the endothermic reaction is applied in an extremely efficient manner capable of regulation at will, viz partly by external heating of the steel cylinder and partly by the super-heat of the steam.

When the temperature and time necessary for the film-magnetization of the pyrites have been determined by a preliminary test, these can be regulated to a nicety in practical operation because the composition of the superheated steam is quite definite. The temperature may vary between 300° C. and 500° C. for different ores, but in practice a temperature of about 425° C. has been found to give excellent results in the film-magnetization of the pyrites without allowing the blende and other sulphide minerals to be affected.

The passage of the ore through the furnace can be rendered continuous and the time during which an ore particle is exposed to the reaction may be regulated with considerable exactness. In certain tests I have found a reaction period of 20 minutes or less to be sufficient.

What I claim as my invention and desire to secure by Letters Patent is:—

1. A process for the treatment of metallic sulphide ores containing iron pyrites which consists in heating the ore, ground to suitable size, in an atmosphere of steam at such a temperature and for such a time that the surfaces only of the iron pyrites particles are affected, so that these particles are rendered paramagnetic to facilitate their magnetic separation from other minerals present.

2. A process for the treatment of metallic sulphide ores containing iron pyrites which consists in heating the ore, ground to suitable size, in an atmosphere of superheated steam at such a temperature and for such a time that the surfaces only of the iron pyrites particles are affected, so that these particles are rendered paramagnetic by a reaction in which the steam takes part to facilitate their magnetic separation from other minerals present.

3. A process for the treatment of metallic sulphide ores containing iron pyrites which consists in heating the ore, ground to suitable size, in an atmosphere of steam at such a temperature and for such a time that the surfaces only of the iron pyrites particles are affected, the particles being subjected during the process to movement of such a character as to assist in exposing them to the steam, so that these particles are rendered paramagnetic by a reaction in which the steam takes part to facilitate their magnetic separation from other minerals present.

4. A process for the treatment of metallic sulphide ores containing iron pyrites which consists in heating the ore, ground to suitable size, in an atmosphere of steam at such a temperature and for such a time that the surfaces only of the iron pyrites particles are affected, the particles being subjected during the process to agitation in a drum rotating about a non-vertical axis, so that these particles are rendered paramagnetic to facilitate their magnetic separation from other minerals present.

5. A process for the treatment of metallic sulphide ores containing iron pyrites which consists in heating the ore, ground to suitable size, in an atmosphere of steam at such a temperature and for such a time that the surfaces only of the iron pyrites particles are affected, the particles being subjected during the process to agitation in an externally heated drum rotating about a non-vertical axis, so that these particles are rendered paramagnetic to facilitate their magnetic separation from other minerals present.

6. A process for the treatment of metallic sulphide ores containing iron pyrites which consists in continuously feeding the ore through a heated treatment chamber and passing a current of steam over the ore in a direction opposite to the direction of travel of the ore, the temperature and rate of passage of the ore and steam being so regulated that the reaction renders the iron pyrites particles sufficiently paramagnetic on their surfaces only to be removable by a magnetic separator.

7. A process for the treatment of metallic sulphide ores containing iron pyrites which consists in continuously feeding the ore, with agitation to bring the particles successively to the surface of the mass, through a heated treatment chamber and passing a current of steam over the ore in a direction opposite to the direction of travel of the ore, the temperature and rate of passage of the ore and steam being so regulated that the reaction renders the iron pyrites particles sufficiently paramagnetic on their surfaces only to be removable by a magnetic separator.

In testimony whereof I affix my signature.

WALTER GEORGE PERKINS.